(12) United States Patent
Hsiao et al.

(10) Patent No.: US 8,971,177 B1
(45) Date of Patent: Mar. 3, 2015

(54) EVENT TRIGGER AND MANAGEMENT SYSTEM FOR PROVIDING AUTOMATIC REPEAT REQUESTS BY SINGLE TIMER AND METHOD THEREOF

(71) Applicants: Hsu-Feng Hsiao, Hsinchu (TW);
Kuan-Ju Tseng, Hsinchu (TW);
Chung-Nan Lee, Kaohsiung (TW)

(72) Inventors: Hsu-Feng Hsiao, Hsinchu (TW);
Kuan-Ju Tseng, Hsinchu (TW);
Chung-Nan Lee, Kaohsiung (TW)

(73) Assignees: National Sun Yat-Sen University, Kaohsiung (TW); National Chiao Tung University, Hsinchu (TW)

( * ) Notice: Subject to any disclaimer, the term of this patent is extended or adjusted under 35 U.S.C. 154(b) by 0 days.

(21) Appl. No.: 14/050,377

(22) Filed: Oct. 10, 2013

(51) Int. Cl.
*H04L 1/18* (2006.01)
*H04L 12/26* (2006.01)
*H04W 74/00* (2009.01)

(52) U.S. Cl.
CPC .................................. *H04W 74/002* (2013.01)
USPC .......................................... 370/218; 714/748

(58) Field of Classification Search
USPC .......... 370/216–253; 714/746–749, 775–776, 714/16–18
See application file for complete search history.

(56) References Cited

U.S. PATENT DOCUMENTS

| | | | |
|---|---|---|---|
| 6,920,598 B2* | 7/2005 | Chen et al. ..................... | 714/748 |
| 6,988,236 B2* | 1/2006 | Ptasinski et al. .............. | 714/758 |
| 7,177,274 B2* | 2/2007 | Van Der Zee et al. ........ | 370/230 |
| 7,657,815 B2* | 2/2010 | Seidel et al. ................... | 714/748 |
| 8,743,787 B2* | 6/2014 | Bostrom et al. .............. | 370/328 |

* cited by examiner

*Primary Examiner* — Thai Hoang
(74) *Attorney, Agent, or Firm* — Chih Feng Yeh; Huntington IP Consulting Co., Ltd.

(57) ABSTRACT

An event trigger and management system for providing automatic repeat requests (ARQs) by a single timer and a method thereof are provided. Various type timers for providing an ARQ are integrated into a single timer. Through a data structure of a timer node of automatic repeat requests time series, the automatic repeat request time series can be managed only by a single timer. Therefore, the efficiency of controlling and managing a timer associated with Worldwide Interoperability for Microwave Access (WiMAX) may be achieved.

12 Claims, 11 Drawing Sheets

| Type | Name | Value |
|---|---|---|
| integer value | arqTimerType | 0-5 |
| pointer | arqTimerEventParameter | Memory address |
| integer value | framesToCount | 0=infinite<br>1-13107 |
| integer value | insertClockTime | 0-32767 |
| pointer | nextTimerNode | Memory address |
| pointer | prevTimerNode | Memory address |

FIG. 3A

| Value | ARQ timer type |
|---|---|
| 0 | timing block lifetime |
| 1 | timing wait retry |
| 2 | timing synchronous invalid time |
| 3 | timing wait respond time |
| 4 | timing purge time |
| 5 | timing wait repeat discard message time |

FIG. 3B

| arqTimerType | Description of arqTimerEventParameter |
|---|---|
| timing block lifetime | acquiring the management information of the ARQ block from the transmit end state machine" |
| timing wait retry time | acquiring the management information from the transmit end state machine (including connection ID, block numbering, and block range) |
| timing synchronous invalid time | acquiring the information belonging to the transmit end/reception end recording the connection ID and timer from the transmit end state machine |
| timing wait respond time | acquiring the management information of the ARQ block from the reception end state machine |
| timing purge time | acquiring the management information of the ARQ block from the reception end state machine, including the connection ID, block numbering and block range |
| timing wait repeat discard message time | acquiring the management information of the ARQ block from the transmit end state machine (including the connection ID, block numbering and block range), respectively. |

EVENT TRIGGER AND MANAGEMENT SYSTEM FOR PROVIDING AUTOMATIC REPEAT REQUESTS BY SINGLE TIMER AND METHOD THEREOF

BACKGROUND OF THE INVENTION

1. Field of Invention

The present invention is related to an event trigger and management system and method, and particularly an event trigger and management system and method for providing automatic repeat requests (ARQs) by a single timer and a method thereof.

2. Related Art

According to Worldwide Interoperability for Microwave Access (WiMAX) defined by IEEE Std 802.16, automatic repeat requests (ARQs) technique defines six different timers, which are respectively described as follows.

The first timer is used to time a block lifetime of automatic repeat requests (ARQs) block at a transmit end.

After the ARQs block is transmitted for the first time at the transmit end, the transmit end has to time a block lifetime for the ARQs block. If the transmit end does not receive an acknowledgement (ACK) message indicating a successful data transmission from a reception end within the lifetime of the ARQs block, the transmit end allows multiple times of transmission of the ARQs block. Otherwise, the transmit end does not transmit the ARQs block again outside the lifetime.

The second timer is used to time a wait repeat time after the ARQs block is transmitted by the transmit end.

After the ARQs block is transmitted at the transmit end, the transmit end has to time a wait retry time. When the wait retry time is reached, the transmit end has to arrange the ARQs block in an ARQs series for a repeat transmission.

The third timer is used to time synchronous invalid time, i.e., a time required for a next time synchronism of the transmit end/reception end.

The transmit end and the reception end requires such timer of timing the synchronous invalid time.

The fourth timer is used to time a wait respond time required for waiting for a response after a synchronous requirement message is issued by the transmit end/reception end to the reception end/transmit end.

If the wait respond time of the transmit end/reception end is expired.

The fifth timer is used to time a purge time for the reception end to coercively move a first ARQs block in a sliding window.

Before the purge timer is expired, the ARQs block purge timer has to be re-timing when the same ARQs block is received again by the reception end. When the purge timer is expired, the reception end coercively responds the transmit end, and the ARQs block moving the first ARQs block to the purge timer reaching the expiry time has been received. This enable the transmit end not to transmit the ARQs block not received for a long time. Further, the reception end updates the serial number of the first ARQs block into a serial number of the ARQs block not received yet after the ARQs block is expired timed by the purge timer.

The sixth timer is used to time a time required for waiting a repeat transmit discard message after the discard message is transmitted to the reception end. Such timer has a timing length identical to that of the second timer.

The conventional timers of different types may use its block to be controlled and managed, respectively. However, such policy is involved with high complexion and low management efficiency. If the ARQs protocol requires a newly defined timer in the future, an additional engineering required therefore is relatively huge.

In view of the above, there is long a problem in the prior art where the timer associated with the WIMAX environment is not easy to be controlled and managed. Therefore, there is a need to improve technique to solve this problem.

SUMMARY OF THE INVENTION

In view of the problem in the prior art where the timer associated with the WIMAX environment is not easy to be controlled and managed, an event trigger and management system for providing automatic repeat requests by a single timer is disclosed.

In the present invention, the event trigger and management system for providing automatic repeat requests by a single timer comprises a timer, timing repeatedly from 0 to 32767; an automatic repeat request (ARQ) timer series, having a plurality of timer nodes, each comprising a node type parameter, an expired event parameter, a timing time, an insert time, a first pointing parameter and a second point parameter; a computing module, extracting the timing time and the insert time from one of the plurality of the timer nodes from the ARQ timer series to compute the expiry time at the extracted timer node; and an event trigger module, an event trigger module, triggering a corresponding event according to the node type parameter and the expiry event parameter at the extracted timer node when the expiry time of the extracted timer node is identical to a cycle time of the timer, extracting a next one among the plurality of timer nodes and deleting the timer node associated with the timer node having triggered the corresponding event, and directing the computing module to compute the expired time at the extracted timer node, and going back to the computing module to compute the expiry time at the next timer node.

The event trigger and management method for providing automatic repeat requests by a single timer comprises establishing a timer, timing repeatedly from 0 to 32767; establishing an automatic repeat request (ARQ) timer series, having a plurality of timer nodes, each comprising a node type parameter, an expired event parameter, a timing time, an insert time, a first pointing parameter and a second point parameter; extracting the timing time and the insert time from one of the plurality of the timer nodes from the ARQ timer series to compute the expiry time at the extracted timer node; and an event trigger module, triggering a corresponding event according to the node type parameter and the expiry event parameter at the extracted timer node when the expiry time of the extracted timer node is identical to a cycle time of the timer, extracting a next one among the plurality of timer nodes and deleting the timer node associated with the timer node having triggered the corresponding event, and directing the computing module to compute the expired time at the extracted timer node, and going back to the computing module to compute the expiry time at the next timer node.

The disclosed node device and control method are recited as above, and the differences compared with the prior art are that the complexity of implementation of the ARQ timer is reduced, various types of ARQ timer are integrated, in which the single timer along with the data structure of the timer nodes in the ARQ timer series is used to manage the timer nodes in the ARQ timer series to be arranged according to the expiry time of the timer. When the first timer node of the ARQ timer series is expired in time, the timer type of the timer node is served as a basis to trigger the corresponding event and the timer node is removed. In the case that the ARQ protocol needs to expand and newly define a new type of timer, the new timer may be rapidly realized by only newly adding the type of the ARQ timer and the trigger event corresponding thereto.

By referring to the above description, the technique of the present invention may facilitate control and management of the timer associated with the WIMAX protocol.

BRIEF DESCRIPTION OF THE DRAWINGS

The invention will become more fully understood from the detailed description given herein below illustration only, and thus is not limitative of the present invention, and wherein:

FIG. 3A to FIG. 3C are a schematic diagram of a data structure of a timer node of the event trigger and management system for providing automatic repeat requests by a single timer according to the present invention.

DETAILED DESCRIPTION OF THE INVENTION

The present invention will be apparent from the following detailed description, which proceeds with reference to the accompanying drawings, wherein the same references relate to the same elements. With reference to the detailed description, those skilled in the art may use the technical skill to solve the associated problem and thus achieve in the technical efficacy associated therewith, namely, may be enabled to implement the present invention.

The present invention will be apparent from the following detailed description, which proceeds with reference to the accompanying drawings, wherein the same references relate to the same elements. With reference to the detailed description, those skilled in the art may use the technical skill to solve the associated problem and thus achieve in the technical efficacy associated therewith, namely, may be enabled to implement the present invention.

Figure 1:
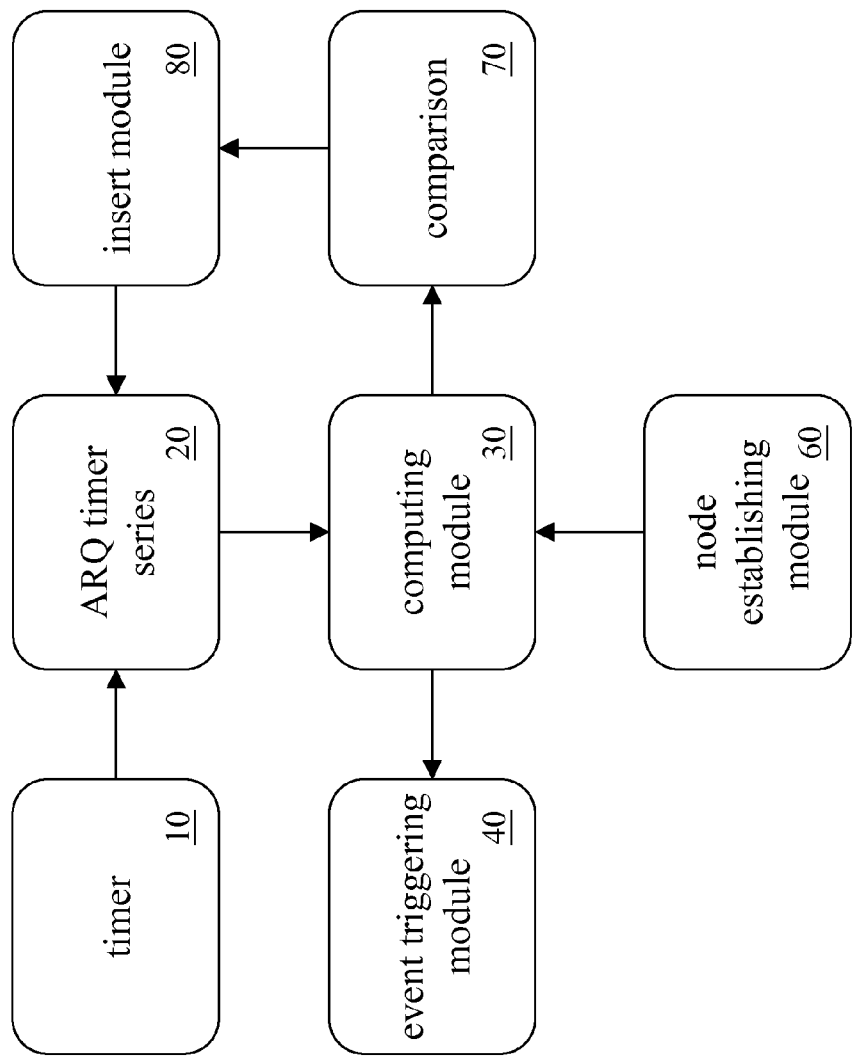
FIG. 1 depicts a systematic block diagram of an event trigger and management system for providing automatic repeat requests by a single timer according to the present invention.
Figure 2:
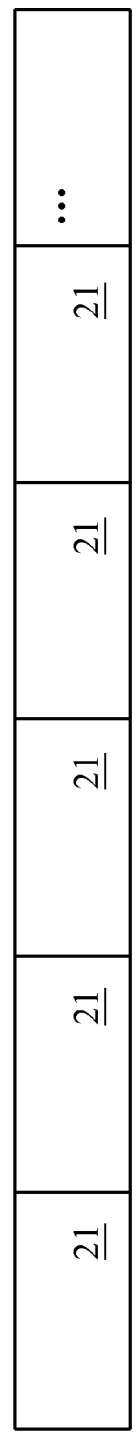
FIG. 2 is a schematic diagram of automatic repeat requests timer of the event trigger and management system for providing automatic repeat requests by a single timer according to the present invention.

In the following, an event trigger and management system for providing automatic repeat requests (ARQs) by using a single timer disclosed in the present invention will be described with reference to FIG. 1, FIG. 2 and FIG. 3A to FIG. 3C. FIG. 1 depicts a systematic block diagram of an event trigger and management system for providing automatic repeat requests by a single timer according to the present invention. FIG. 2 is a schematic diagram of automatic repeat requests timer of the event trigger and management system for providing automatic repeat requests by a single timer according to the present invention. FIG. 3A to FIG. 3C a schematic diagram of a data structure of a timer node of the event trigger and management system for providing automatic repeat requests by a single timer according to the present invention.

At first, a timer 10 is pre-designed, which times from "0" to "32767" repeaterly, i.e. the total cycle time is "32768". The cycled time of the timer 10 is the current time of the timer 10. For example, when the timer 10 times to "125", the cycled time is "125". When the timer 10 times to "500", the cycled time is "500". But, this is only exemplified, not to be used to limit the present invention.

An automatic repeat request (ARQ) timer series 20 has plurality of timer nodes, each further comprises a node type parameter, expiry event parameter, timer time, insert time and pointing parameter, which constitute a data structure of the timer node. The node type parameter is designed as an integer, and used to describe the type of the ARQ timer at the timer node. According to IEEE Std 802.16 protocol, six kinds of ARQ timer are defined. They are "timing block lifetime", "timing wait retry time", "timing synchronous invalid time", "timing wait respond time", "timing purge time" and "timing wait repeat discard message time"

The node type parameters of the timer node each corresponds to the ARQ timers, and are "0", "1", "2", "3", "4", and "5", respectively.

The expiry event parameter of the timer node is designed as a pointer, and used to acquire a parameter required for triggering a corresponding event according to the different ARQ timer types when the ARQ timer is expired, and define the parameter required for triggering the corresponding event by the above-mentioned six kinds of ARQ timers as "acquiring the management information of the ARQ block from the transmit end state machine", "acquiring the management information from the transmit end state machine (including connection ID, block numbering, and block range)", "acquiring the information belonging to the transmit end/reception end recording the connection ID and timer from the transmit end state machine", "acquiring the management information of the ARQ block from the reception end state machine", "acquiring the management information of the ARQ block from the reception end state machine, including the connection ID, block numbering and block range", and "acquiring the management information of the ARQ block from the transmit end state machine (including the connection ID, block numbering and block range)", respectively.

The timing time of the timer node is designed as an integer, presenting the time required for timing of the ARQ timer at the timer node. It is to be noted that the timing time of the timer node is ranged between "1" and "13107". When the timing time of the timer node is "0", the ARQ does not need to time.

The insert time of the timer node is designed as an integer. It means that when the timer node is newly added into the ARQ timer series 20, the cycle time of the timer 10 is the insert time of the timer node.

The first pointing parameter of the timer node is designed as a pointer. Since the timer nodes exist in the ARQ timer series 20 sequentially, the first pointing parameter of such timer node points to a next timer node. For example, the first pointing parameter of the first timer node points to a second timer node, the first point parameter of the second timer node points to the third timer node, the first pointing parameter points of the third timer node to the fourth timer node, etc. This is only for example, and not to be used to limit the present invention.

The second pointing parameter of the timer node is designed as a pointer. Since the timer nodes exist in the ARQ timer series 20 sequentially, the second pointing parameter of such timer node points to its previous timer node. For, example, the second pointing parameter of the fifth timer node points to a fourth timer node, the second point parameter of the fourth timer node points to the third timer node, the second pointing parameter points of the third timer node points to the second timer node, etc. This is only for example, and not to be used to limit the present invention.

A computing module 30 is used to extract a timing time and insert time of the timer node from the ARQ timer series 20, to compute an expiry time of the extracted timer node. The expiry time of the extracted timer node is obtained by dividing a sum of the insert time of the timer node and the timing time of the timer node by a total cycle time of the timer, and using a remainder thereof. For example, assume the timing time of the first timer node is "20", and the insert time of the first timer node is "32767". The expiry time of the first timer node is obtained by dividing the sum of the insert time "32767" of the first timer node and the timing time "20" of the first timer node by a total cycle time "32768" of the timer 10, and then using a remainder thereof, i.e. "19".

When the expiry time of the timer node is the same as the cycle time, an event trigger module 40 triggers the corresponding event according to the node type parameter and the expiry event parameter of the timer node. Further, the event trigger module 40 also extracting the next timer node according to the first pointing parameter of the extracted timer node and delete the timer node having triggered the corresponding event. Further, the event trigger module 40 directs the process back to the computing module 30 to compute again. Such cycle is repeated.

As the example above, when the timer 10 has the cycle time of "19", and the expiry time of the first timer node is also "19", the event trigger module 40 triggers the corresponding event according to the node type parameter of the first timer node and the expiry parameter of the timer node, and delete the first timer node having trigger the corresponding event according to the first pointing parameter of the first timer node. Further the event trigger module 40 also directs the process to go back to the computing module 30 to compute the expiry time of the second timer node. Such cycle is repeated.

When there is a need to newly add a timer node into the ARQ timer series 20, it is required to establish an inserted timer node by using a node establishing module 60. The inserted timer node also includes node type parameter, expiry event parameter, timing time, insert time, first pointing parameter and second pointing parameter. The description of the inserted timer node is the same as the explanation for the timer node, and omitted here for simplicity.

After the inserted timer node is established at the node establishing module 60, the computing module 30 extracts the timing time of the timer node and the insert time to compute the expiry time of the inserted timer node. And, the expiry time of the inserted timer node is obtained by dividing a sum of the insert time of the inserted timer node and timing time of the inserted timer node by the total cycle time of the timer, and using a remainder of the division. For example, assume the timing time of the timer node is "40", the insert time of the inserted timer node is "10", the expiry time of the inserted timer node may be obtained by using the above division. That is, the expiry time of the inserted timer node is obtained as "50" by dividing a sum of the insert time "10" of the inserted timer node and the timing time "40" of the inserted timer node by the total cycle time "37268" of the timer, and taking the remainder "50" of the division as the result.

Thereafter, the computing module 30 computes the remaining expiry time of the timer node by referring to the cycle time of the timer 10 and the expiry time of the timer node. Specifically, the remaining expiry time of the timer node is obtained by first deducting the cycle time of the timer 10 from the expiry time of the timer node to obtain a time difference, and then launching an AND operation on the time difference and a difference of the total cycle time of the timer deducting "1". For example, with the parameters same to the above example, assume the timer 10 has the cycle time "10". The cycle time "10" of the timer 10 is deducted from the expiry time "19" of the first timer node to obtain "9". The total cycle time "32768" deducts 1 to obtain "32767". Then, "9" and "32767" are subjected to an AND operation to obtain "9".

Thereafter, the computing module 30 decides a remaining expiry time of the inserted timer node, which is also the timing time of the timer node. For the example above, assume the timing time of the inserted timer node is "40", the remaining expiry time of the inserted timer node is "40".

After the computing module 30 computes the expiry time of the inserted timer node and the remaining expiry time of the inserted timer node, a comparison module 70 is used to compare the remaining expiry time of the extracted timer node and the remaining expiry time of the inserted timer node. When the remaining expiry time of the extracted timer node is larger than the remaining expiry time of the extracted timer node, an insert module 80 inserts the inserted timer node into before the inserted timer node, so as to newly add the inserted timer node in the ARQ timer series 20.

For example, assume the remaining expiry time of the extracted timer node is "9", and the remaining expiry time of the inserted timer node is "5". At this time, since the remaining expiry time of the extracted timer node "9" is larger than the remaining expiry time of the inserted timer node is "5", an insert module 80 inserts the inserted timer node before the extracted timer node, so as to newly add the inserted timer node in the ARQ timer series 20.

When the comparison module 70 compares as that the remaining expiry time of the timer node is smaller than the remaining expiry time of the timer no, it extracts a next timer node according to the first pointing parameter of the extracted timer node, and directs the process to the computing module 30 to compute for the next timer node. This cycle is repeated. When the remaining expiry time of each of all the timer nodes is smaller than the remaining expiry time of the inserted timer node, the insert module 80 inserts the inserted timer node after a last timer node of the ARQ timer series 20, so as to newly add the inserted timer node into the ARQ timer series 20.

Figure 4A:
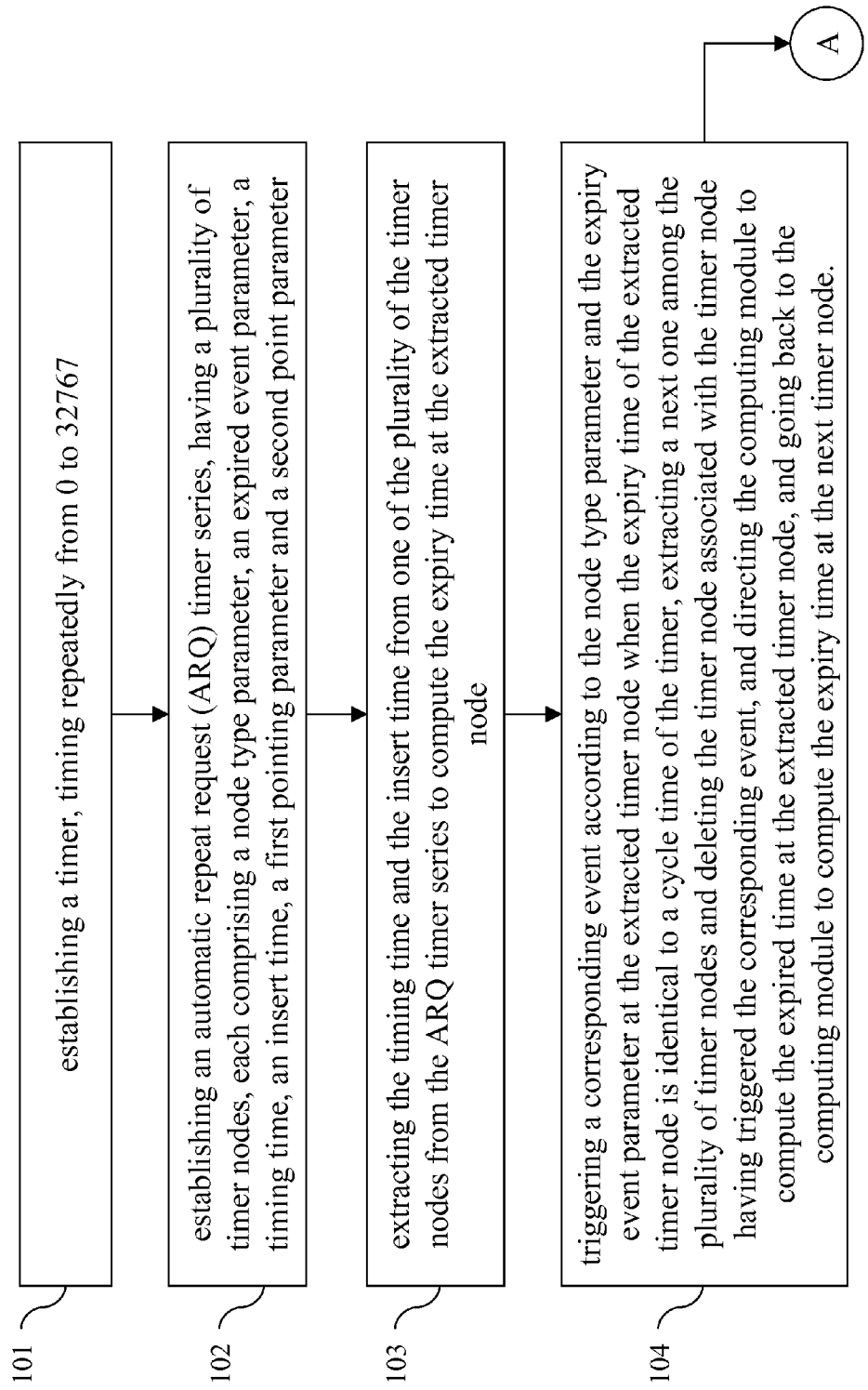
FIG. 4A to FIG. 4C are a flowchart of the event trigger and management method for providing automatic repeat requests by a single timer according to the present invention.
Figure 4B:
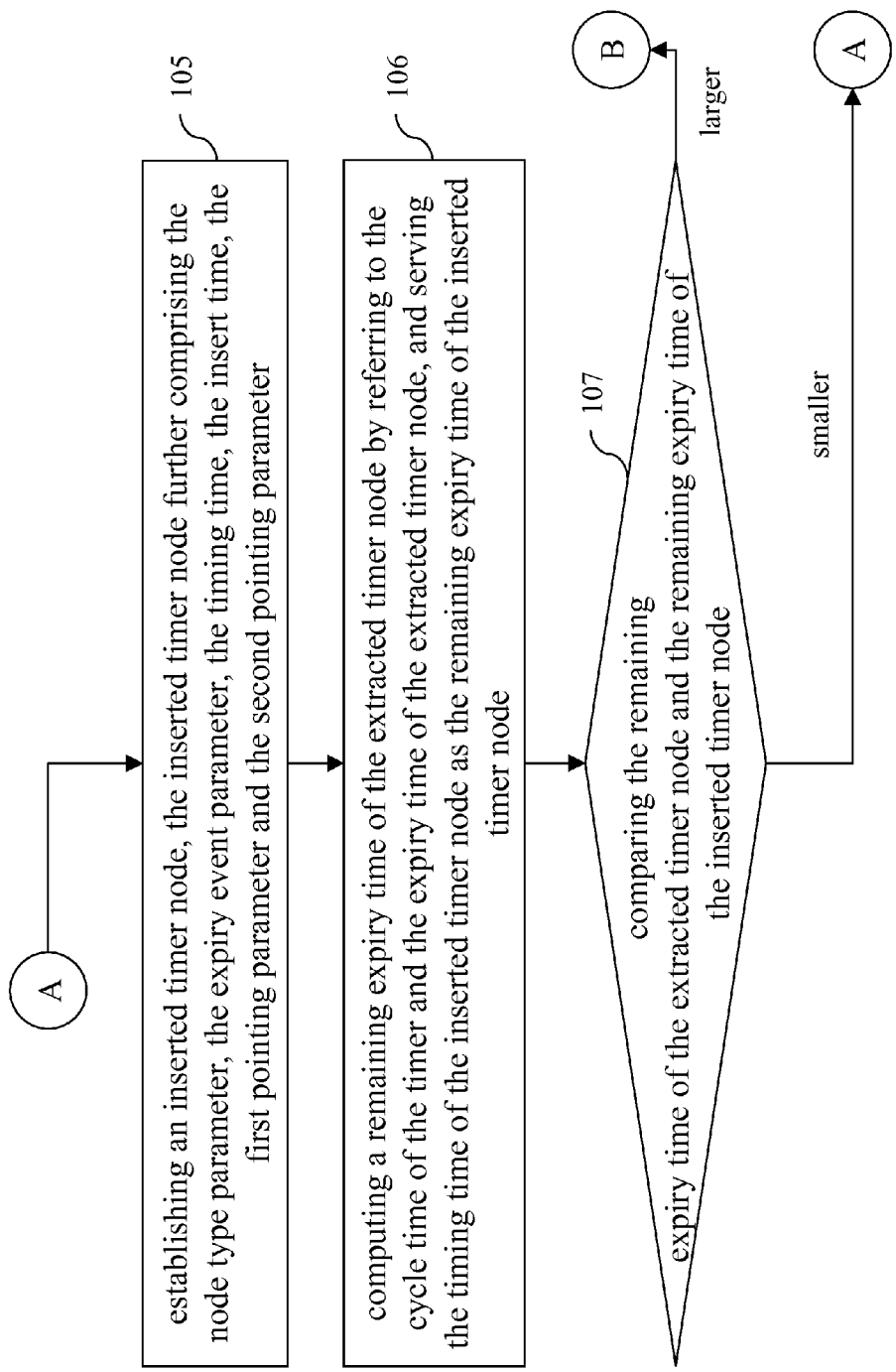
Figure 4C:
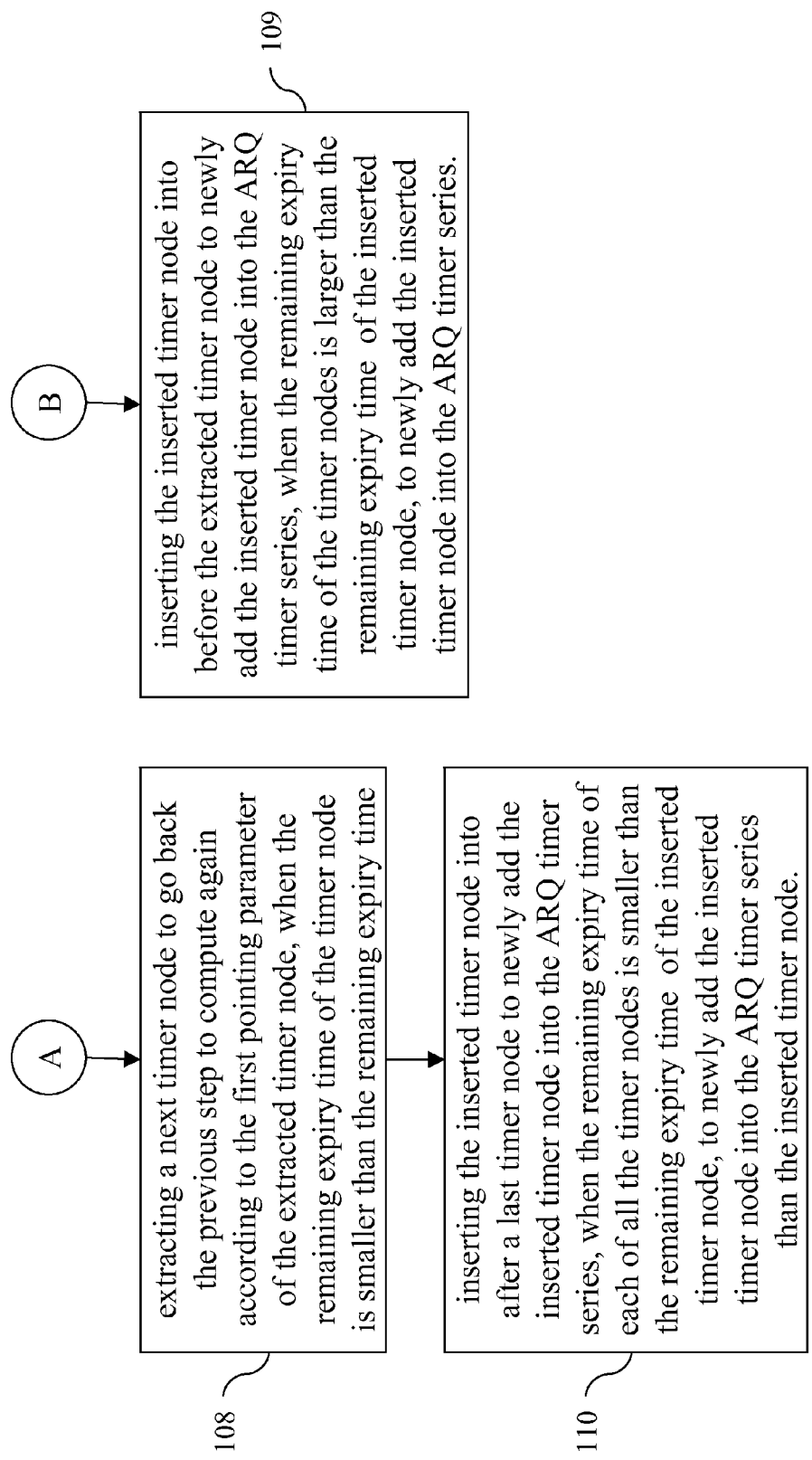

Subsequently, an embodiment is described for the operation and process of the present invention, which is made with reference to FIG. 1, FIG. 4A to FIG. 4C. FIG. 4A to FIG. 4C are a flowchart of the event trigger and management method for providing automatic repeat requests by a single timer according to the present invention.

Figure 5:
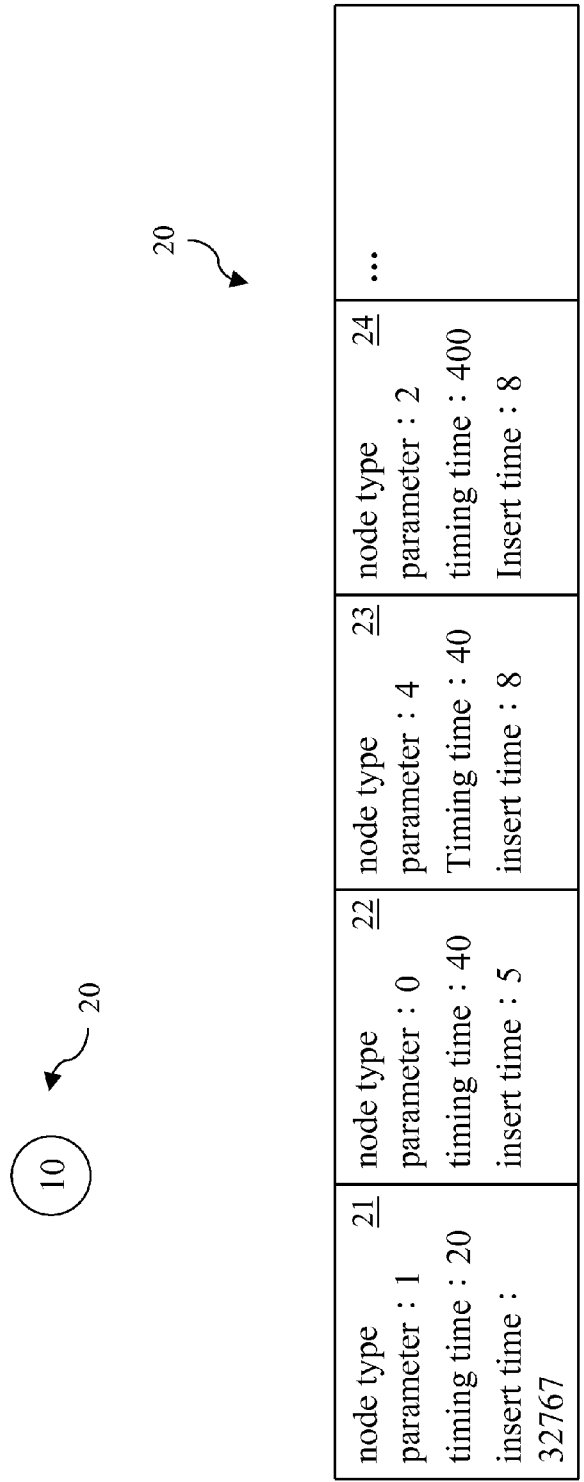
FIG. 5 is a schematic diagram of automatic repeat requests timer of the event trigger and management system for providing automatic repeat requests by a single timer according to the present invention.

Referring to FIG. 5, which is a schematic diagram of automatic repeat requests timer of the event trigger and management system for providing automatic repeat requests by a single timer according to the present invention.

In this embodiment, a timer 10 is pre-designed, which times from "0" to "32767" repeatedly (S101), i.e. the total cycle time is "32768". The cycle time of the timer 10 is "10". In this embodiment, the ARQ timer series 20 pre-established at least includes a first timer node 21, a second timer node 22, a third timer node 23, and a fourth timer node 24 (S102).

The first timer node 21 has its node type parameter "1", and acquires the expiry event parameter "acquiring the management information of the ARQ block (including connection ID, block numbering and block range) from the transmit end state machine". The first timer node 21 has its timing time of "20", insert time of "32767", and first pointing parameter of a pointer pointing the second timer node 22 (S102).

"The second timer node 22 has its node type parameter "0". The third timer node 23 acquires its expiry event parameter "acquiring the management information from the transmit end state machine (including connection ID, block numbering, and block range)". The second timer node 22 has its timing time of "40", insert time of "5", first pointing parameter of a pointer pointing the third timer node 23, and second pointing parameter of a pointer pointing the first timer node 21 (S102). The third timer node 23 has its node type parameter "4". The third timer node 23 acquires its expiry event parameter "acquiring the management information of the ARQ block from the reception end state machine (including connection ID, block numbering and block range)". The third timer node 23 has its timing time of "40", insert time of "8", first pointing parameter of a pointer pointing the fourth timer node 24, and second pointing parameter of a pointer pointing the second timer node 22 (S102).

The fourth timer node 24 has its node type parameter "2". The fourth timer node 24 acquires its expiry event parameter "acquiring the information belonging to the transmit end/reception end recording the connection ID and timer from the transmit end state machine". The fourth timer node 24 has its timing time of "400", first pointing parameter of a pointer pointing the next timer node, and second pointing parameter of a pointer pointing the third timer node 23. The third timer node 23 has its insert time of "8" (S102).

The computing module 30 extracts the timing time "20" and the insert time "32767" of the first timer node 21 from the ARQ timer series 20, to compute the expiry time of the first timer node 21. Specifically, a sum of the insert time "32767" and the timing time "20" of the first timer node 21 is obtained, and then the sum is divided by the total cycle time "32768" of the timer 10 to obtain a remainder "19". The expiry time of the first timer node 21 is the remainder "19" (S103).

When the timer 10 cycles by countering from "10" to "19". The cycle time "19" of the timer 10 is the same as the expiry time "19" of the first timer node. The event trigger module 40 triggers the corresponding event according to the node type parameter "1" of the first timer node 21 and the expiry event parameter of the timer node "acquiring the information of the timer block from the transmit end state machine, including connection ID, block numbering block range" (S104).

Thereafter, according to that the first pointing parameter of the first timer node 21 is a pointer pointing the second timer node 22, the second timer node 22 is extracted and the first timer node 21 having trigger the corresponding event is deleted. At this time, the process goes back to the computing module 30 to compute again for the next timer node. This cycle is repeated.

Figure 6:
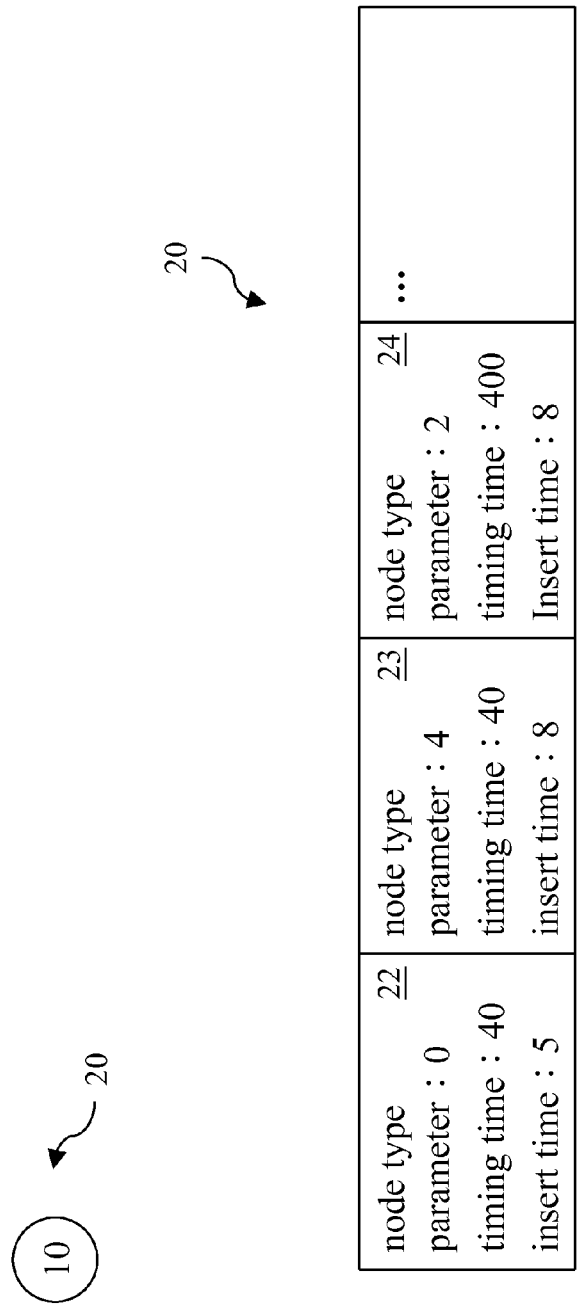
FIG. 6 is a schematic diagram of a process result of automatic repeat requests timer of the event trigger and management system for providing automatic repeat requests by a single timer according to the present invention.

Under the process above, the ARQ timer series 20 is as shown in FIG. 6. FIG. 6 is a schematic diagram of a process result of automatic repeat requests timer of the event trigger and management system for providing automatic repeat requests by a single timer according to the present invention.

Referring to FIG. 5 again. When it is required to newly add a timer node in the ARQ timer series 20, an inserted timer node 25 may be established at the node establishing module 60. The established inserted timer node 25 has its node type parameter "0", acquired expiry event parameter "acquiring the management information of the ARQ block from the transmit end state machine, including connection ID, block numbering and block range", timer time "40", and insert time "10" (S105).

Subsequently, the computing module 30 extracts the timing time "40" and the insert time "10" of the inserted timer node 25, to compute the expiry time of the inserted timer node 25. Specifically, a sum of the insert time "10" and the timing time "40" of the timer node 25 is obtained, and then the sum is divided by the total cycle time "32768" of the timer 10 to obtain a remainder "50". The expiry time of the timer node 25 is the remainder "50".

Thereafter, the computing module 30 computes the remaining expiry time of the first timer node 21 by referring to the cycle time "10" of the timer 10 and the expiry time "19" of the first timer node 21. Specifically, the cycle time "10" of the timer 10 is deducted from the expiry time of the first timer node 21 to obtain "9". The total cycle time "32768" of the timer 10 deducts "1" to obtain "32767". "9" and "32767" are subjected to an AND operation to obtain "9", which is the remaining expiry time "9" of the first timer node 21.

Thereafter, the computing module 30 takes the timing time "40" of the inserted timer node 25 as the remaining expiry time "40" of the inserted timer node 25.

When the computing module 30 computes the remaining expiry time "9" of the first timer node 21 and the remaining expiry time of the inserted timer node 25, the comparison module 70 compares the remaining expiry time "9" of the first timer node 21 and the remaining expiry time "40" of the inserted timer node 25 (S107), and the former is smaller than the latter is determined (S108).

At this time, the first pointing parameter of the first timer node 21 serves as pointer of the second timer node 22, to extract the timing time "40" of the second timer node 22 and the insert time "5" of the second timer node, to compute the expiry time of the second timer node. Specifically, a sum of the insert time "5" and the timing time "40" of the second timer node 22 is obtained, and then the sum is divided by the total cycle time "32768" of the timer 10 to obtain a remainder "45". The expiry time of the second timer node 22 is the remainder "45" (S103).

Thereafter, the computing module 30 computes the remaining expiry time of the second timer node 22 by referring to the cycle time of the timer 10 and the expiry time of the second timer node 22. Specifically, the remaining expiry time of the timer node is obtained by first deducting the cycle time "10" of the timer 10 from the expiry time "45" of the second timer node 22 to obtain a time difference, which is "35", and then launching an AND operation on the time difference and a difference of the total cycle time of the timer 10 deducting "1", which is "32767". At this time, "35" AND "32767" are "35", which is right the remaining expiry time of the second timer node 22.

After the computing module 30 computes the remaining expiry time "35" of the second timer node 22 and the remaining expiry time "40" of the inserted timer node 25, the comparison module 70 compares the remaining expiry time "35" of the second timer node 22 and the remaining expiry time "40" of the inserted timer node 25 (S107), and the former is smaller than the latter is determined in the comparison (S108).

According to that the first pointing parameter of the second timer node 22 is a pointer pointing the third timer node 23, the timing time of the third pointer node 23 is extracted as "40" and the insert time of the third pointer node 23 as "8", to compute the expiry time of the third timer node 23. Specifically, a sum of the insert time "8" and the timing time "40" of the timer node 23 is obtained, and then the sum is divided by the total cycle time "32768" of the timer 10 to obtain a remainder "48". The expiry time of the timer node 23 is the remainder "48".

Thereafter, the computing module 30 computes the remaining expiry time of the third timer node 23 by first deducting the cycle time "10" of the timer 10 from the expiry time of the third timer node 23 to obtain a time difference "38", and then launching an AND operation on the time difference "38" and a difference of the total cycle time "32678" of the timer 10 deducting "1". The total cycle time "32768" deducts 1 to obtain "32767". Then, "38" and "32767" are subjected to an AND operation to obtain "38".

When the computing module 30 computes the remaining expiry time "38" of the third timer node 23 and the remaining expiry time "40" of the inserted timer node 25, the comparison module 70 compares the remaining expiry time "38" of the third timer node 23 and the remaining expiry time "40" of the inserted timer node 25 (S107), and that the former is smaller than the latter is determined (S108).

According to that the first pointing parameter of the third timer node 23 is a pointer pointing the fourth timer node 24, the timing time of the fourth pointer node 24 is extracted as "400" and the insert time of the fourth pointer node 24 as "8", to compute the expiry time of the fourth timer node 24. Specifically, a sum of the insert time "8" and the timing time "400" of the fourth timer node 24 is obtained, and then the sum is divided by the total cycle time "32768" of the timer 10 to obtain a remainder "408". The expiry time of the fourth timer node 24 is the remainder "408".

Thereafter, the computing module 30 computes the remaining expiry time of the fourth timer node 24 by first deducting the cycle time "10" of the timer 10 from the expiry time of the fourth timer node 24 to obtain a time difference "398", and then launching an AND operation on the time difference "398" and a difference of the total cycle time "32678" of the timer 10 deducting "1". The total cycle time "32768" deducts 1 to obtain "32767". Then, "398" and "32767" are subjected to an AND operation to obtain "398", which is right the remaining expiry time "398" of the fourth timer node 24.

When the computing module 30 computes the remaining expiry time "398" of the fourth timer node 24 and the remaining expiry time "40" of the inserted timer node 25, the comparison module 70 compares the remaining expiry time "398" of the fourth timer node 24 and the remaining expiry time "40" of the inserted timer node 25 (S107), and that the former is larger than the latter is determined (S109).

At this time, the insert module 80 inserts the inserted timer node 25 into before the fourth timer node 24, and changes the first pointing parameter of the third timer node 23 into the inserted timer node 25. The first pointing parameter of the inserted timer node 25 is right the fourth timer node 24. The second pointing parameter of the inserted timer node 25 is left the third timer node 23. The second pointing parameter of the fourth timer node 24 is changed into the inserted timer node 25, to newly add the inserted timer node 25 into the ARQ timer series 20 (S109).

Figure 7:
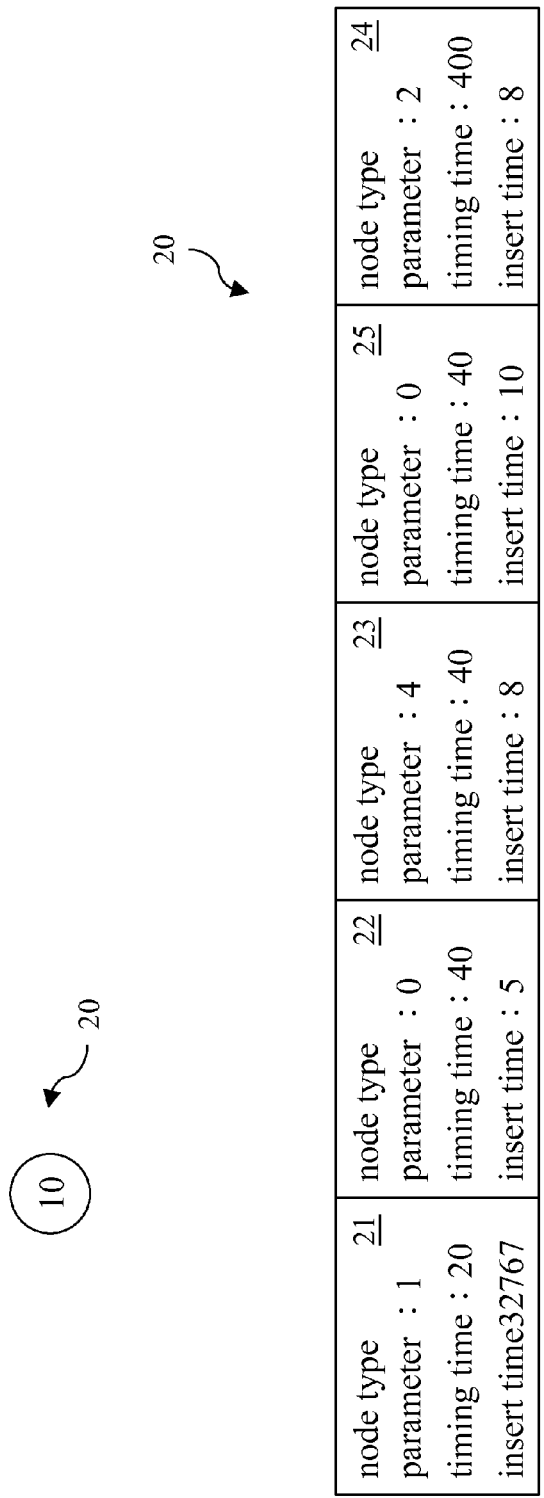
FIG. 7 is a schematic diagram of a process result of automatic repeat requests timer of the event trigger and management system for providing automatic repeat requests by a single timer according to the present invention.

The ARQ timer series 20 as processed as the above may be referred to FIG. 7, which is a schematic diagram of a process result of automatic repeat requests timer of the event trigger and management system for providing automatic repeat requests by a single timer according to the present invention.

The above process cycle is repeated. When the remaining expiry time for all the timer nodes is smaller than the remaining expiry time "40" of the inserted timer node 25, the insert module 80 inserts the inserted timer node 25 after a last one timer node of the ARQ timer series 20, to newly add the inserted timer node into the ARQ timer series 20 (S110).

In view of the above, the differences between the present invention and the prior art reside in that the complexity of implementation of the ARQ timer is reduced, various types of ARQ timer are integrated, in which the single timer along with the data structure of the timer nodes in the ARQ timer series is used to manage the timer nodes in the ARQ timer series to be arranged according to the expiry time of the timer. When the first timer node of the ARQ timer series is expired in time, the timer type of the timer node is served as a basis to trigger the corresponding event and the timer node is removed. In the case that the ARQ protocol needs to expand and newly define a new type of timer, the new timer may be rapidly realized by only newly adding the type of the ARQ timer and the trigger event corresponding thereto.

By referring to the above description, the technique of the present invention may facilitate control and management of the timer associated with the WIMAX protocol.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An event trigger and management system for providing automatic repeat requests (ARQs) by a single timer, comprising:
   a timer, timing repeatedly from 0 to 32767;
   an ARQ timer series, having a plurality of timer nodes, each comprising a node type parameter, an expired event parameter, a timing time, an insert time, a first pointing parameter and a second point parameter;
   a computing module, extracting the timing time and the insert time from one of the plurality of the timer nodes from the ARQ timer series to compute the expiry time at the extracted timer node; and
   an event trigger module, triggering a corresponding event according to the node type parameter and the expiry event parameter at the extracted timer node when the expiry time of the extracted timer node is identical to a cycle time of the timer, extracting a next one among the plurality of timer nodes and deleting the timer node associated with the timer node having triggered the corresponding event, and directing the computing module to compute the expired time at the extracted timer node, and going back to the computing module to compute the expiry time at the next timer node.

2. The trigger and management system as claimed in claim 1, further comprising:
   a node establishing module, establishing an inserted timer node, the inserted timer node further comprising the node type parameter, the expiry event parameter, the timing time, the insert time, the first pointing parameter and the second pointing parameter;
   the computing module, computing a remaining expiry time of the extracted timer node by referring to the cycle time of the timer and the expiry time of the extracted timer node, and serving the timing time of the inserted timer node as the remaining expiry time of the inserted timer node;
   a comparing module, comparing the remaining expiry time of the extracted timer node and the remaining expiry time of the inserted timer node, and extracting a next one among the plurality of timer nodes to go back to the computing module according to the first pointing parameter of the extracted timer node when the remaining expiry time of the extracted timer node is smaller than the remaining expiry time of the inserted timer node; and
an insert module, inserting the inserted timer node into before the extracted timer node to newly add the inserted timer node into the ARQ timer series, when the remaining expiry time of the extracted timer node is greater than the remaining expiry time of the inserted timer node; inserting the inserted timer node into after a last one of the plurality of timer nodes in the ARQ timer series to newly add the inserted timer node into the ARQ timer series when the remaining expiry time of each of the timer nodes is smaller than the inserted timer node.

3. The trigger and management system as claimed in claim 1, wherein the expiry time of the extracted timer node is obtained by dividing a sum of the insert time of the extracted timer node and the timing time of the extracted timer node by a total cycle time of the timer node, and using a remainder thereof.

4. The trigger and management system as claimed in claim 2, wherein the remaining expiry time of the extracted timer node is obtained by deducting the expiry time of the extracted timer node with the cycle time of the timer to obtain a difference and subjecting the total cycle time of the timer deducting 1 and the difference to an AND operation, and using the AND result.

5. The trigger and management system as acclaimed in claim 2, wherein the expiry time of the inserted timer node is obtained by dividing a sum of the insert time of the inserted timer node and the timing time of the inserted timer node by the total cycle time of the timer, and using a remainder thereof.

6. The trigger and management system as acclaimed in claim 2, wherein the remaining expiry time of the inserted timer node is the timing time of the inserted timer node.

7. An event trigger and management method for providing automatic repeat requests (ARQs) by a single timer, comprising:
establishing a timer, timing repeatedly from 0 to 32767;
establishing an automatic repeat request (ARQ) timer series, having a plurality of timer nodes, each comprising a node type parameter, an expired event parameter, a timing time, an insert time, a first pointing parameter and a second point parameter;
extracting the timing time and the insert time from one of the plurality of the timer nodes from the ARQ timer series to compute the expiry time at the extracted timer node; and
an event trigger module, triggering a corresponding event according to the node type parameter and the expiry event parameter at the extracted timer node when the expiry time of the extracted timer node is identical to a cycle time of the timer, extracting a next one among the plurality of timer nodes and deleting the timer node associated with the timer node having triggered the corresponding event, and directing the computing module to compute the expired time at the extracted timer node, and going back to the computing module to compute the expiry time at the next timer node.

8. The trigger and management method as claimed in claim 7, further comprising:
establishing an inserted timer node, the inserted timer node further comprising the node type parameter, the expiry event parameter, the timing time, the insert time, the first pointing parameter and the second pointing parameter;
the computing module, computing a remaining expiry time of the extracted timer node by referring to the cycle time of the timer and the expiry time of the extracted timer node, and serving the timing time of the inserted timer node as the remaining expiry time of the inserted timer node;
comparing the remaining expiry time of the extracted timer node and the remaining expiry time of the inserted timer node, and extracting a next timer node to go back to the computing module according to the first pointing parameter of the extracted timer node when the remaining expiry time of the extracted timer node is smaller than the remaining expiry time of the inserted timer node; and
inserting the inserted timer node into before the extracted timer node to newly add the inserted timer node into the ARQ timer series, when the remaining expiry time of the extracted timer node is greater than the timer node of the inserted timer node; inserting the inserted timer node into after a last one of the plurality of timer nodes in the ARQ timer series to newly add the inserted timer node into the ARQ timer series when the remaining expiry time of each of the timer nodes is smaller than the inserted timer node.

9. The trigger and management method as claimed in claim 7, wherein the expiry time of the extracted timer node is obtained by dividing a sum of the insert time of the extracted timer node and the timing time of the extracted timer node by a total cycle time of the timer node, and using a remainder thereof.

10. The trigger and management method as claimed in claim 9, wherein the remaining expiry time of the extracted timer node is obtained by deducting the expiry time of the extracted timer node with the cycle time of the timer to obtain a difference and subjecting the total cycle time of the timer deducting 1 and the difference to an AND operation, and using the AND result.

11. The trigger and management method as acclaimed in claim 9, wherein the expiry time of the inserted timer node is obtained by dividing a sum of the insert time of the inserted timer node and the timing time of the inserted timer node by the total cycle time of the timer.

12. The trigger and management method as acclaimed in claim 9, wherein the remaining expiry time of the inserted timer node is the timing time of the inserted timer node.

* * * * *